(12) United States Patent
Thoppae et al.

(10) Patent No.: US 10,504,373 B2
(45) Date of Patent: Dec. 10, 2019

(54) VEHICULAR ZONE LOCATING SYSTEM

(71) Applicants: Bosch Automotive Service Solutions, Inc., Warren, MI (US); Robert Bosch GmbH, Stuttgart (DE)

(72) Inventors: Vijai Thoppae, Canton, MI (US); Sujith Nair, Farmington Hills, MI (US); Jeremy Lynn Hargis, Novi, MI (US); Sharath Kommera, Novi, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 60 days.

(21) Appl. No.: 15/834,758

(22) Filed: Dec. 7, 2017

(65) Prior Publication Data

US 2018/0190127 A1    Jul. 5, 2018

Related U.S. Application Data

(60) Provisional application No. 62/440,192, filed on Dec. 29, 2016.

(51) Int. Cl.
| | |
|---|---|
| *G08G 1/00* | (2006.01) |
| *B60C 23/04* | (2006.01) |
| *G07C 5/00* | (2006.01) |
| *H04L 29/08* | (2006.01) |
| *H04W 64/00* | (2009.01) |
| *H04M 1/725* | (2006.01) |

(52) U.S. Cl.
CPC ......... *G08G 1/207* (2013.01); *B60C 23/0435* (2013.01); *B60C 23/0461* (2013.01); *B60C 23/0479* (2013.01); *G07C 5/008* (2013.01); *G08G 1/205* (2013.01); *H04L 67/00* (2013.01); *H04L 67/18* (2013.01); *H04W 64/00* (2013.01); *H04L 67/12* (2013.01); *H04M 1/72525* (2013.01)

(58) Field of Classification Search
CPC .......... G08G 1/207; G08G 1/00; G08G 1/205; B60C 23/0034; B60C 23/0461; B60C 23/04; G07C 5/00
USPC ....................................................... 701/29.6
See application file for complete search history.

(56) References Cited

U.S. PATENT DOCUMENTS

| | | | | |
|---|---|---|---|---|
| 5,910,782 A * | 6/1999 | Schmitt | ..................... | G08G 1/14 340/539.1 |
| 7,330,131 B2 * | 2/2008 | Zanotti | .................. | G07B 15/02 340/928 |
| 8,306,734 B2 * | 11/2012 | Mathews | ........... | G01C 21/3685 701/408 |
| 9,950,579 B2 * | 4/2018 | Sogabe | .................... | B60C 23/04 |
| 10,242,573 B2 * | 3/2019 | Stefik | ..................... | G06Q 10/02 |

(Continued)

*Primary Examiner* — Tan Q Nguyen
(74) *Attorney, Agent, or Firm* — David Kovacek; Maginot, Moore & Beck LLP (57) ABSTRACT

A system for locating a vehicle utilizing a zone posts in known locations that when the vehicle comes within a proximity of the zone post receives an identification signal from the vehicle and sends that identification signal on to a central command center. The identification signal may be provided by a dongle or a tire pressure monitoring system tire pressure sensor. The central command center may be queried with vehicle identifying information, and the location of the zone post that last sent the identification signal is provided as an indication of the location of the vehicle.

20 Claims, 8 Drawing Sheets

(56) References Cited

U.S. PATENT DOCUMENTS

| | | | |
|---|---|---|---|
| 2013/0113936 A1* | 5/2013 | Cohen | G07B 15/02 |
| | | | 348/148 |
| 2016/0232565 A1* | 8/2016 | Goergen | G06Q 30/0255 |
| 2016/0371481 A1* | 12/2016 | Miyake | G06F 21/445 |
| 2017/0021760 A1* | 1/2017 | Calnek | H04W 4/02 |
| 2017/0353879 A1* | 12/2017 | Rad | H04L 43/0894 |
| 2018/0096542 A1* | 4/2018 | Mader | G07C 5/085 |

* cited by examiner

VEHICULAR ZONE LOCATING SYSTEM

TECHNICAL FIELD

This disclosure relates to systems providing convenient ways to locate a vehicle within a finite space, such as a dealership, rental lot, or parking structure.

BACKGROUND

In today's dealerships, rental car facilities, valet lots and self-parking lots, people have challenges with locating vehicles. Whether it is the location of a certain number of vehicles on a dealerships lot for a perspective buyer, perhaps based on a specific make and model of the vehicle for instance, or a vehicle dropped off by a customer that has a trouble code set and needs repair, knowing where the vehicle is at within the dealership saves time and reduces frustration for all involved. Rental car facilities and valet lots often have one person drop the car off and then another pick the car up, and in this transfer, the location of the vehicle can become confusing. Even when self-parking a car, it can be easy to forget the exact last location in a large parking lot or multi-floor parking structure, and having a solution for locating your own car can save time and reduce stress. People want a cost effect solution that helps them find their car efficiently and in a timely manner.

SUMMARY

One aspect of this disclosure is directed to a system for locating a vehicle. This system has zone posts, and each zone post is configured to be spaced apart from adjacent zone posts in known locations. In this system, each zone post is configured to emit a Tire Pressure Monitoring System (TPMS) tire pressure sensor activation signal to activate a TPMS sensor of a vehicle when the TPMS sensor comes into a proximity of the zone post. This system is also configured to receive an identification signal emitted from the activated TPMS sensor and broadcast a vehicle identification signal based on the received TPMS sensor identification signal. In this system a central command center communicates with the zone posts to receive the vehicle identification signal from at least one of the zone posts and then provide the known location of the zone post as an indication of the location of the vehicle.

In this aspect of the disclosure, the central command center may provide the indication of the location of the vehicle as the known location of the zone post that last in-time broadcasted the identification signal. The activation signal emitted from the zone post may be substantially 125 Kilohertz, while the identification signal emitted from an activated TPMS sensor may be substantially 315 or 433 Megahertz, and the vehicle identification signal emitted from the zone post may be substantially 2.4 or 5 Gigahertz. The vehicle identification signal may be the TPMS sensor identification number.

Another aspect of this disclosure is directed to a similar system for locating a vehicle. This system utilizes a dongle configured to be plugged in to an OBDII port of a vehicle and emit a vehicle identification signal. This system also has zone posts spaced apart from adjacent zone posts in known locations. These zone posts communicate with a central command center. Each of these zone posts are configured to receive the vehicle identification signal emitted from the dongle when it comes in proximity to the zone post. The zone posts then send the vehicle identification signal to the central command center, and the central command center upon receipt of the vehicle identification signal can provide a location of the zone post as an indication of the location of the vehicle.

In this aspect, the central command center may communicate with a hand held electronic device which is configured to aid a user in locating a vehicle based on the location of the zone post that provided the last in time identification signal. The dongle may be used to connect with the vehicle to access vehicle identification information. The vehicle identification information may include the Vehicle Identification Number (VIN) of the vehicle. The VIN contains make and model information of a vehicle, and the central command center may, upon receipt of at least one make and model query from a user, display zone posts with vehicles having differing VIN numbers but fitting the at least one make and model query.

As well, in this aspect, the dongle may be further configured to access trouble code information of the vehicle and relay the trouble code information on to the central command center. Then the central command center may also be configured to, upon receipt of at least one trouble code query from a user, display zone posts with vehicles having the at least one trouble code query.

A further aspect of this disclosure is directed to another similar system for locating a vehicle. In this system, a zone post is configured to receive an identification signal from a vehicle and, upon receipt of the identification signal, send a notification signal indicating receipt of the identification signal. In this system, the notification signal includes within it data to identify the vehicle.

In this system the zone post may send an excitation signal to excite a response of the identification signal from the vehicle. The identification signal may be sent by a tire pressure monitoring sensor of the vehicle. Conversely, a dongle may be plugged in to an OBDII port of the vehicle, and the dongle may send the identification signal.

Also in this system, a downloadable application for hand held electronic device may be provided to a user. The downloadable application may be configured to, upon receipt of data to identify a vehicle query, provide the location of the zone post that sent the notification signal with the data to identify the vehicle.

In this system, similar to the others, the zone post may be a number of zone posts spaced apart from adjacent zone posts in known locations. And a central command center may be configured to receive the notification signals from the number of zone posts, and upon receiving notification signals, chronologically log data related to the known location of the zone post and the data to identify the vehicle.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
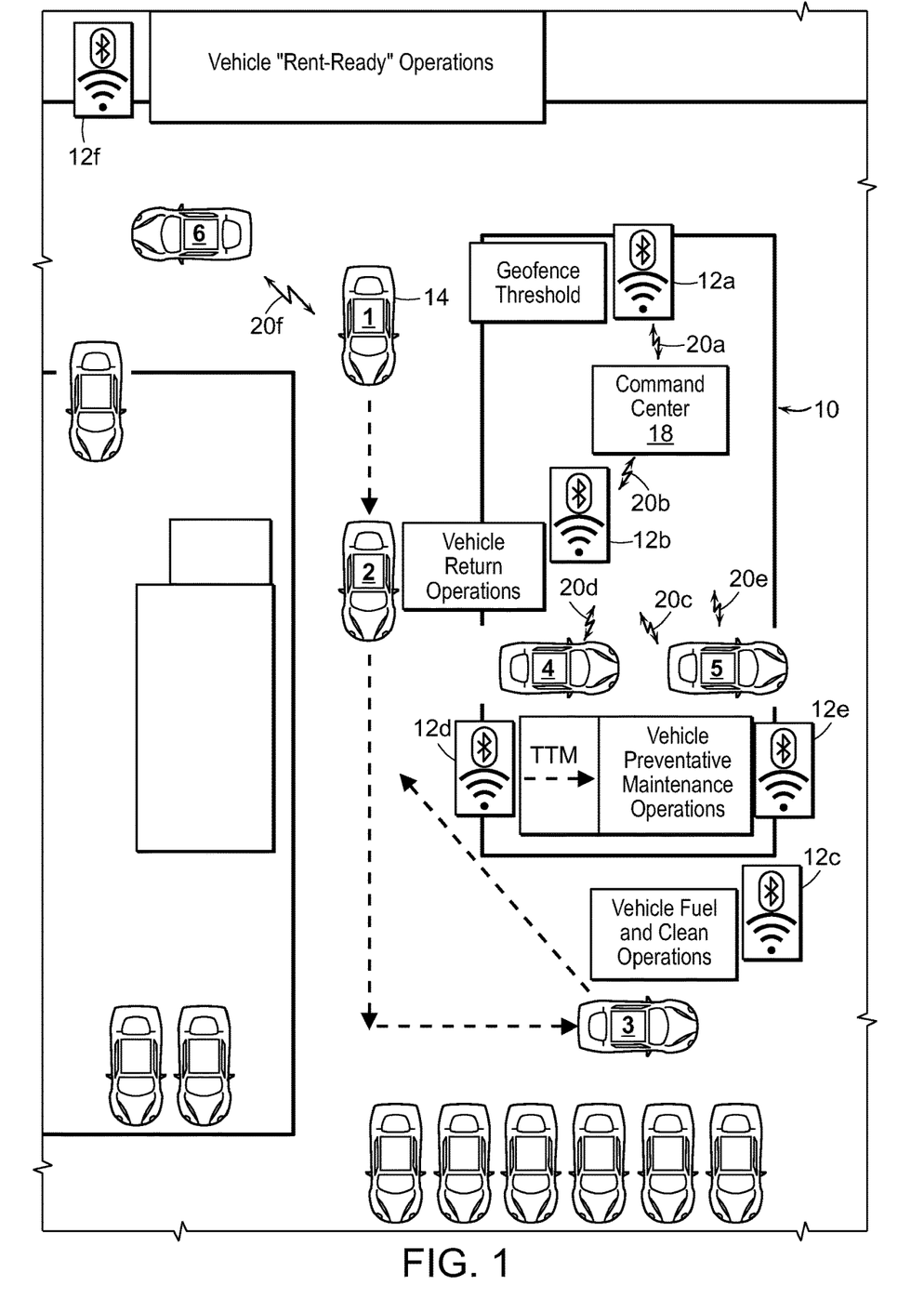
FIG. 1 is a diagrammatic illustration of a rental car facility with zone posts located in known locations around the rental car facility.

FIG. 1 shows an illustration of a rental car facility 10 with zone posts 12 located in known locations around the rental car facility 10. A rental car facility 10 could also be a dealership, service station, automotive workshop, fleet management center, or any professional establishment which stations vehicles into different areas for any different reason. A first zone post 12a is located at the entrance to the rental car facility 10. When a vehicle 14 comes into proximity with the first zone post 12a, the zone post 12a receives from the vehicle 14 a vehicle identifier 16. The first zone post 12a is placed in a known location, such as the entrance, so as to know if a vehicle has entered or exited the rental car facility. In this example, a second zone post 12b is located at vehicle return operations, where rental customers return the vehicle. A third zone post 12c may be located where rental vehicle 14 is refueled or cleaned. A fourth zone post 12d may be located in the tire read maintenance area. A fifth zone post 12e may be located in a vehicle maintenance area. And a sixth zone post 12f may be located in a staging area for the rental vehicle 14. The zone posts 12a, 12b, 12c, 12d, 12e, 12f are shown here in communication with a central command center 18 via signals 20a, 20b, 20c, 20d, 20e, 20f, respectively. The central command center 18 can then be used to recall the last zone post 12 which sent a signal 20 with a vehicle identifier 16 to provide a zone location for the vehicle 14.

Figure 2:
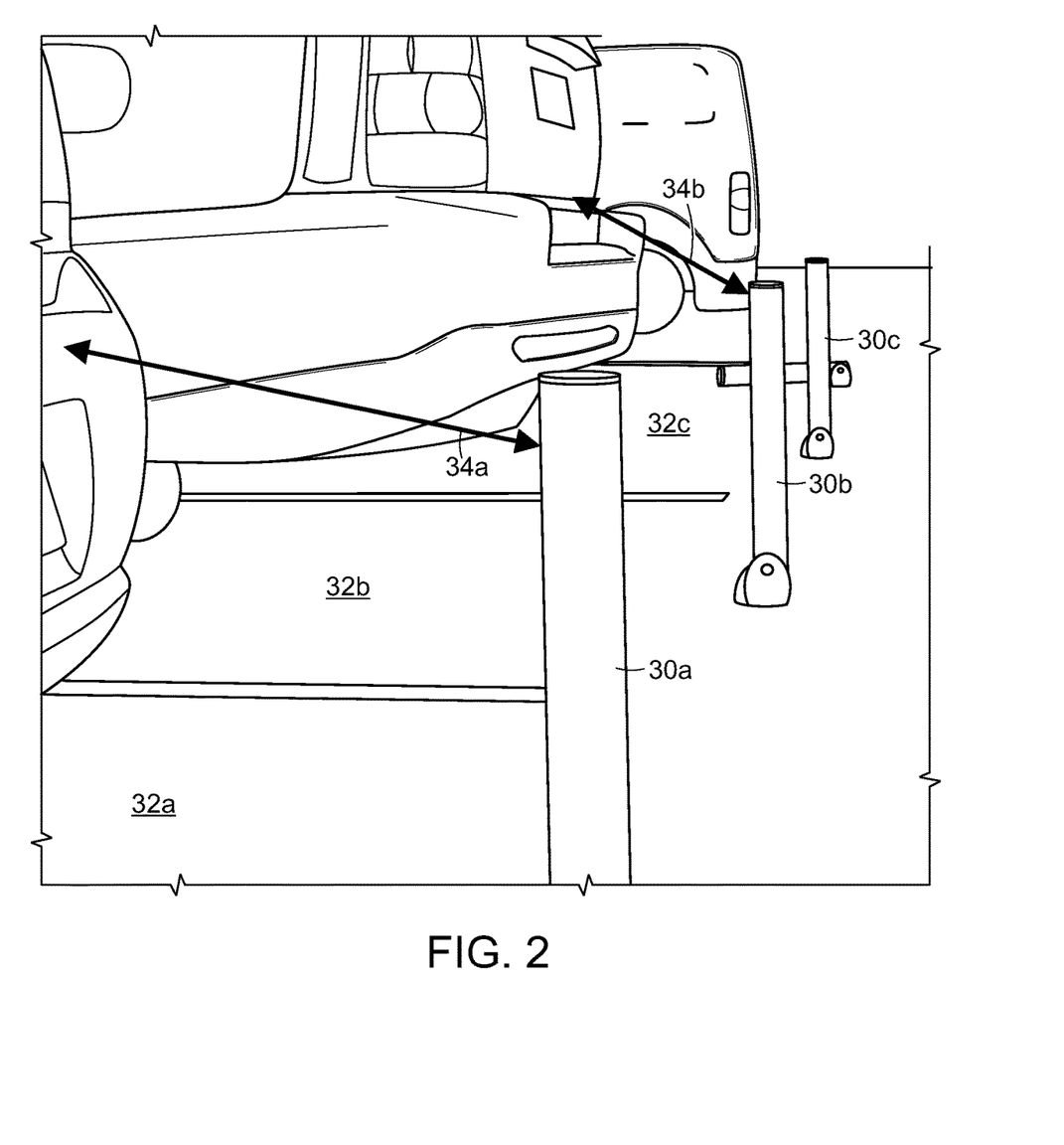
FIG. 2 is a diagrammatic illustration of zone posts located at each known parking space.

FIG. 2 shows an example of zone posts 30 located at each known parking space 32. For example, the first parking space 32a has a zone post 30a receiving a vehicle identifier 34a from vehicle 14a. Similarly, the second parking space 32b has a zone post 30b receiving a vehicle identifier 34b from vehicle 14b. There is no vehicle in parking space 32c, thus there is no vehicle identifier being received by zone post 30c. The vehicle identifier 34 may be a signal broadcast from the vehicle 14 and received by the zone post 30 when the vehicle 14 is within a certain proximity of the zone post 30. The vehicle identifier 34 may be data carried on the signal. The vehicle identifier 30 may be provided by a two way communication link between the vehicle 14, a portion of the vehicle 14, such as a sensor on the vehicle, or a third device that is connect to or carried within the vehicle 14. All of the zone posts 30 may also be in communication with a central command center 18 (see FIG. 1).

Figure 3:
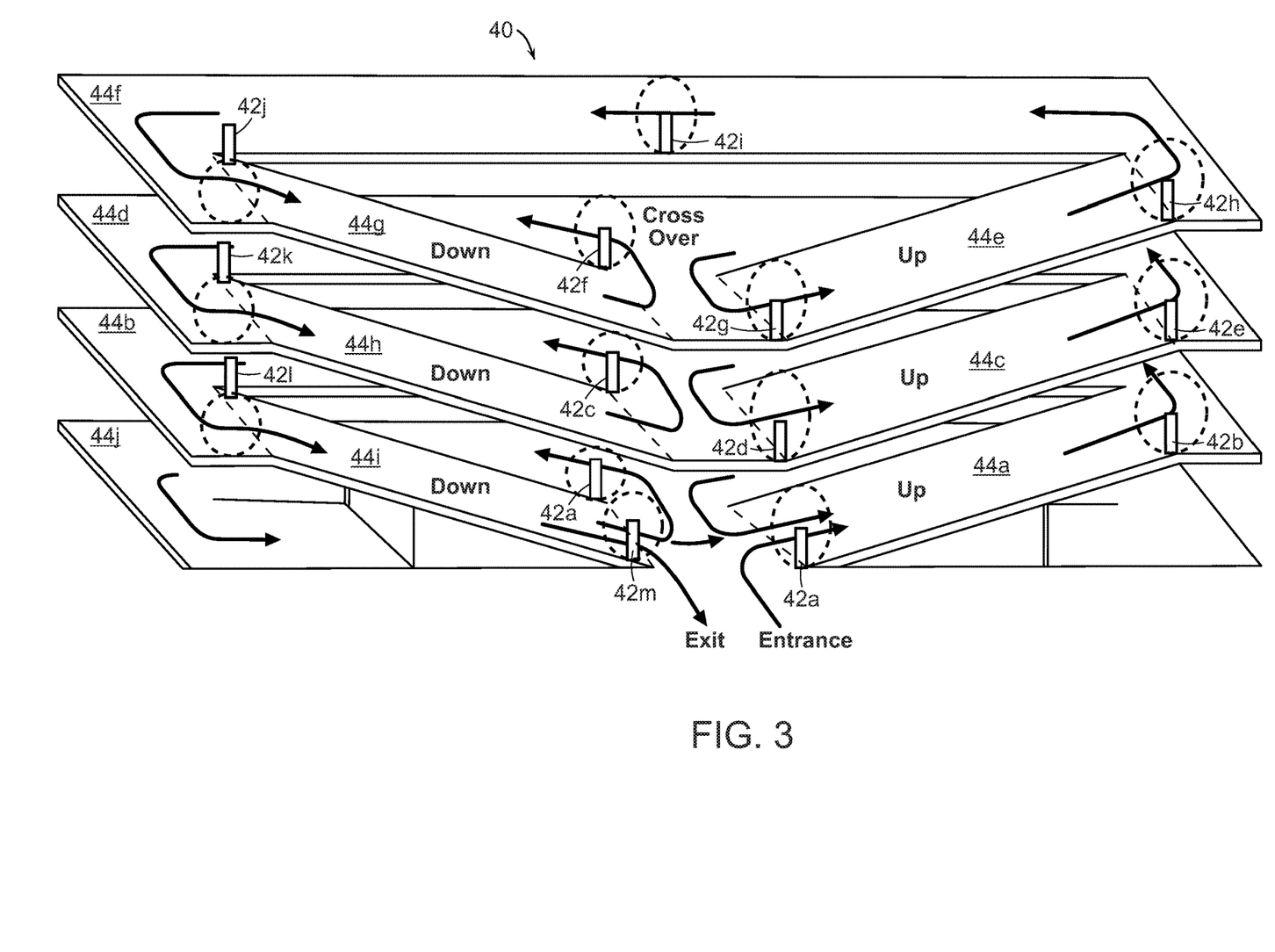
FIG. 3 is a diagrammatic illustration of a multi-level parking structure with zone posts located at known transition points within the structure.

FIG. 3 shows an example of a multi-level parking structure 40 with zone posts 42 located at known transition points 44 within the structure 40. Zone post 42a is located on the beginning of the first-to-second up-ramp 44a. Zone post 42b is located at the top of the first-to-second up-ramp 42b. Zone post 42c is located at the cross-over 44b of the second floor of the structure 40. Zone post 42d is located on the second-to-third up-ramp 44c. Zone post 42e is located at the top of the second-to-third up-ramp 44c. Zone post 42f is located at the cross-over of the third floor 44d. Zone post 42g is located at the beginning of the third-to-fourth up-ramp 444. Zone post 42h is located at the top of the third-to-fourth up-ramp 44e. Zone post 42i is located at the cross-over of the fourth floor 44f. Zone post 42j is located at the top of the fourth-to-third down-ramp 44g. Zone post 42k is located at the top of the third-to-second down-ramp 44h. Zone post 42l is located at the top of the second-to-first down-ramp 44i. Zone post 42m is located at the entrance to the first floor 44j. And zone post 42n is located at the bottom of the second-to-first down-ramp 44i.

By placing the zone posts 42 in these known locations 44, when a vehicle passes by the proximity of the zone post 42 (as illustrated by the dashed lined ovals), a vehicle identifier is picked up by the zone post 42. The zone posts 42 may then be in communication with a central command center 18 (see FIG. 1) and a person may access the stored data of the central command center 18 to query the which zone post 42 was the last to send in a signal for that vehicle identifier. In other words, if a vehicle entered the parking structure at noon and proceeded up the first-to-second up-ramp, and then parked on the second floor 44b after the cross-over location, then zone post 42a would have sent in a signal, followed in time by zone post 42b, followed in time by 42c. And then no other zone posts 42 would have sent in a signal with such a vehicle identifier, thus the vehicle is located on the second floor 44b after the cross-over. In the case of a parking structure 40, the vehicle identifier could be provided at the entrance in the form of a parking ticket (not shown).

Figure 4:
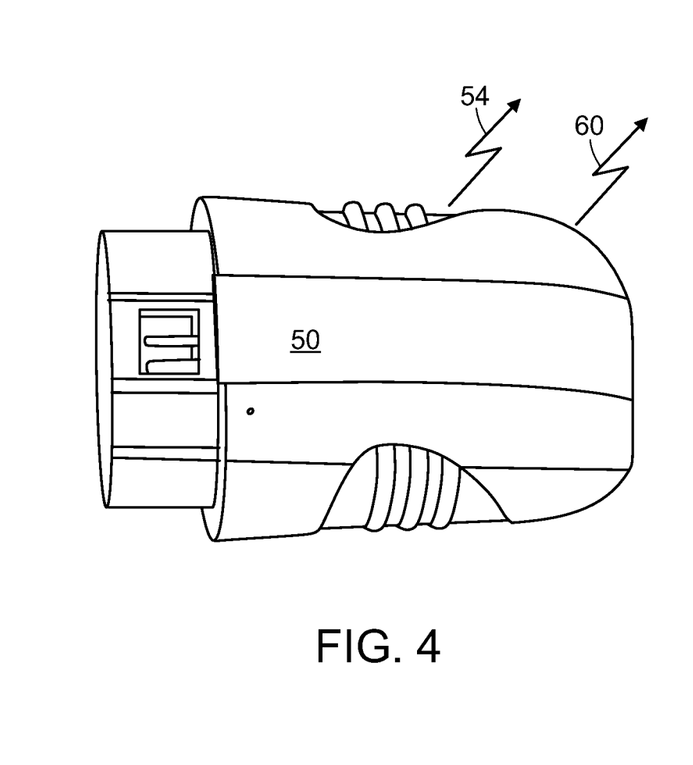
FIG. 4 is an illustration of a dongle which is configured to plug into an OBDII port of a vehicle.
Figure 6:
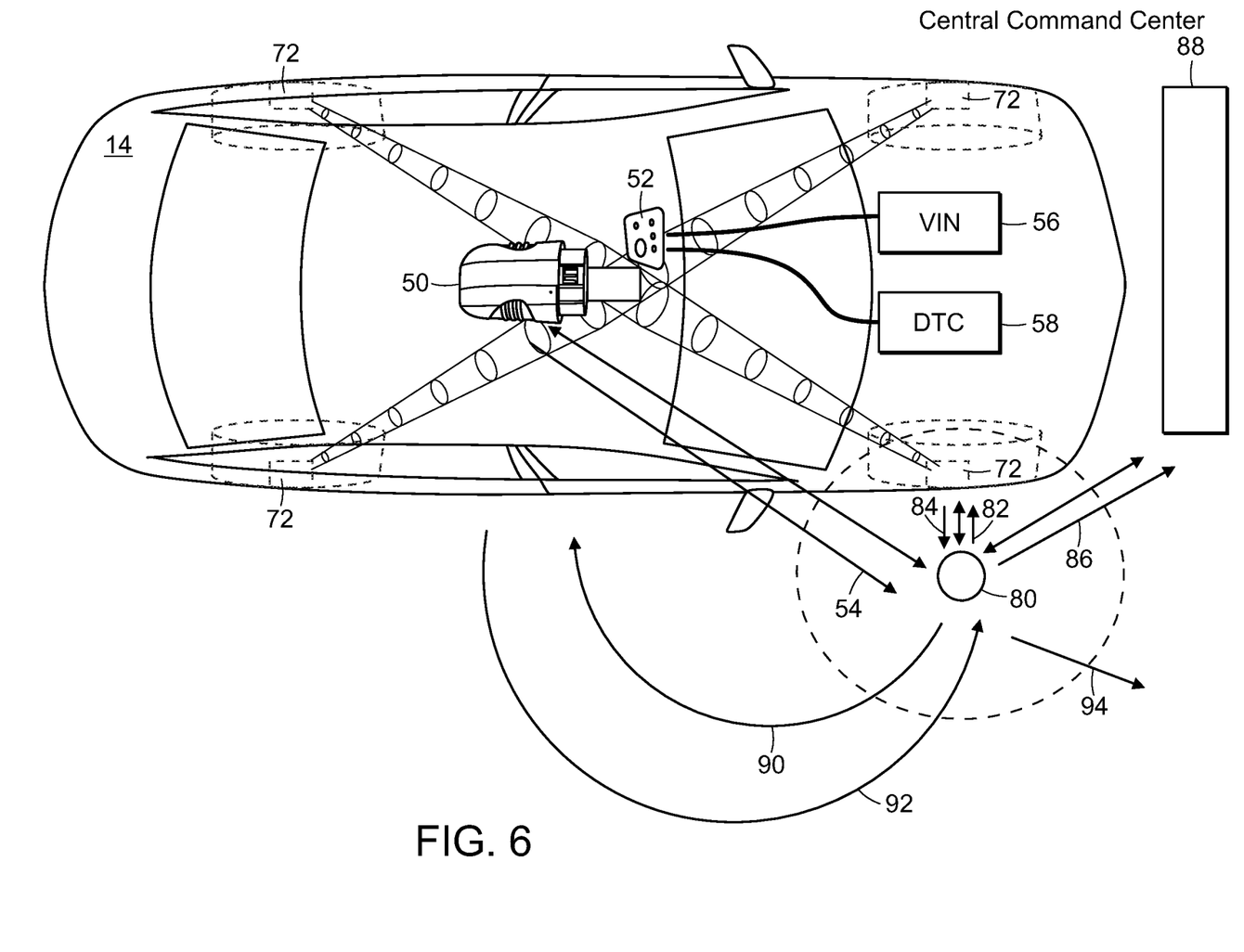
FIG. 6 is a diagrammatic illustration of a zone post communicating with either a dongle or a TPMS sensor or both.

FIG. 4 shows a dongle 50 which is configured to plug into an OBDII port 52 of a vehicle 14 (see FIG. 6). The dongle 50 may be provided by a rental car facility 10 and placed into every rental vehicle 14 to be used only with zone post 12 at the facility (see FIG. 1). The dongle 50 may be purchased by the owner of a vehicle 14 and used at any location offering zone posts 30 or 42 (see FIGS. 2 and 3). The dongle 50 may be provided upon entering a parking structure 40 (see FIG. 3), plugged into the OBDII port while in the structure, and then returned upon leaving the structure. The dongle 50 may be configured to emit a vehicle identification signal 54. The vehicle identification number may be a number specific to the dongle 50 and not the vehicle 14. The dongle 50 may be powered by the vehicle's 14 12-volt electric system through the OBDII port. The dongle 50 may also have its own power source.

The dongle 50 may also connect with the vehicle 14 (see FIG. 6) to access vehicle identification information. Vehicle identification information may include the Vehicle Identification Number (VIN) 56 of the vehicle (see FIG. 6). The beginning part of a VIN contains year, make, and model information of a vehicle, further numbers reveals trim levels or engine types, and further numbers provide for a vehicle specific number that no other vehicle has. In the case of a specific vehicle being desired to be located, a full VIN could be used. In the case of a dealership, simply placing in a query for a make and model could bring up all the vehicles within proximity to a zone post, and then provide the locations of the zone posts proximate to vehicles of that make and model. The system may also take in the VIN number, but then assign that VIN a user name, such that the actual VIN is an unseen number to the user. The user would then query using the user name, the system would translate and locate using the VIN as accessed by the dongle 50.

The dongle 50 may also be configured to access trouble code information 58 of the vehicle (see FIG. 6) and relay the trouble code information 60 on to the central command center 18 (See FIG. 1). This could be very useful for a rental car lot, since vehicles may sit for longer periods of time and tire pressures may become low. A query for low tire pressure could be run in the central command center and the location of all vehicles with low tire pressure could be found. The dongle could identify the low tire pressure, the VIN or vehicle identifier, and the zone post would relay the location of the vehicle. Then the technician of the rental car company could simply take a portable air pressure supply to the vehicles around the parking lots. It is also contemplated that there is efficiency in technicians performing the same kind of repairs on vehicles in a sequential order. This allows for a vehicle bay to utilize the same or similar tools in a sequential order. For instance, all vehicles on the lot of a dealership service center with an O2 sensor failure could be located and all repaired sequentially before moving on to vehicles with other same trouble codes.

Figure 5:
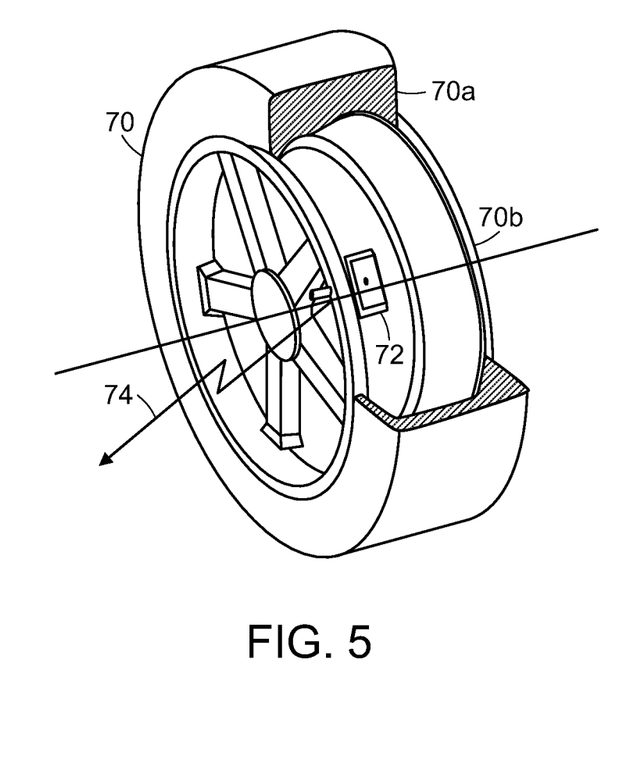
FIG. 5 is a partially cut-away illustration of a wheel and tire assembly showing a TPMS sensor.

FIG. 5 shows a wheel and tire assembly 70 with a portion of the tire 70a cut-away from the wheel 70b. The cut-away tire 70a reveals a Tire Pressure Monitoring System (TPMS) sensor 72. Not only would this TPMS sensor send pressure information to the vehicle 14 that could then be used with a dongle 50 (See FIGS. 4 and 6) embodiment for locating vehicles with low tire pressure, it could also be used to provide the vehicle identifier 34 via a TPMS sensor signal 74.

FIG. 6 shows a zone post 80 communicating with either a dongle 50 or a TPMS sensor 72 or both. In one embodiment, the zone post 80, which has been shown to be configured to be spaced apart from adjacent zone posts if there are adjacent zone posts (see FIGS. 1-3) in a known locations, is configured to emit a TPMS tire pressure sensor activation signal 82. The activation signal emitted from the zone post 80 is substantially 125 Kilohertz. The activation signal 82 activates a TPMS sensor 72 when the TPMS sensor 72 passes within a certain proximity of the zone post 80. The proximity can differ, and amplifying circuitry may be used, but a proximity distance of 3 feet or closer is desired. When the TPMS sensor 72 is activated it broadcasts an identification signal 84 containing at least temperature, pressure, and a sensor identification number. The zone post 80 is configured to receive the identification signal 84 emitted from the activated TPMS sensor 72. The identification signal 84 emitted from the activated TPMS sensor 72 is substantially 315 or 433 Megahertz. The zone post 80 is then able to broadcast a vehicle identification signal 86 based on the received TPMS sensor identification signal 84. The vehicle identification signal 86 emitted from the zone post 80 is substantially 2.4 or 5 Gigahertz.

In this embodiment, the vehicle identification signal 86 is the TPMS sensor identification number. The number itself is not key to this system, rather in the scenario of a parking structure, when a vehicle 14 pulls up to the entrance and takes a ticket to park, a TPMS sensor 72 may be excited and the zone post 80 can communicate with the TPMS sensor 72 and receive the TPMS sensor identification number. This number may be printed on the parking ticket (not shown), or assigned a user name different from the number, or a bar code, or any other pseudonyms. As the vehicle 14 moves through the parking structure similar to that shown when describing FIG. 3, zone posts 80 (or 42 as shown in FIG. 3) will excite and receive the TPMS sensor identification number when the TPMS sensor 72 comes into proximity of the zone post 80 to which it passes. The customer may then take the ticket with them and upon returning may enter the number, or slide the ticket into a reader, at a kiosk (not shown) or using their cell phone (not shown) both of which are in communication with the zone posts 80 directly or with a central command center 88, and the system may provide to the ticket holder the location of the vehicle within the parking structure.

Continuing with FIG. 6, another embodiment is shown. In a second embodiment, the zone post 80, which has been shown to be configured to be spaced apart from adjacent zone posts if there are adjacent zone posts (see FIGS. 1-3) in a known locations, is also configured to communicate with a central command center 88. The zone post 80 is also configured to receive a vehicle identification signal 54 emitted from a dongle 50. The dongle 50 may be plugged into the OBDII port 52 as described above. The dongle 50 may send the vehicle identification signal 54 only when it comes into a certain proximity to the zone post 80. In this embodiment, the signal strength of the dongle 50 may control the proximity distance. However, the zone post 80 may use a proximity sensor, such as a motion sensor (not shown), and when the zone post 80 is excited by movement, it may send out a dongle communication signal and receive back the identification signal 54. The proximity of dongle excitation may be controlled by the strength of the dongle communication signal only exciting the dongles 50 within that proximity. It is also envisioned that the dongles 50 and zone posts 80 may be in relative constant communication, and the zone posts 80 in a facility work together to triangulate the location of a dongle 50 based on time lapse between receiving notification signals. In this embodiment, the zone post 80 is configured to send the vehicle identification signal 86 to the central command center 88.

Still yet continuing with FIG. 6, another embodiment is shown. In a third embodiment, the zone post 80, which has been shown to be configured to be spaced apart from adjacent zone posts if there are adjacent zone posts (see FIGS. 1-3) in a known locations, is also configured to send an excitation signal 90 to excite a response of the identification signal from the vehicle 14. The zone post 80 is then configured to receive an identification signal 92 from a vehicle 14. Upon receipt of identification signal 92, the zone post 80 sends a notification signal 94 indicating receipt of the identification signal 92. The notification signal 94 including within data to identify the vehicle 14.

All three embodiments may use a central control center 88. However, it is understood that a network of communicating zone posts 80 may fulfill the same concept as a central control center 88. It is also envisioned that a cloud based data set is populated by the zone posts 80 and accessible using a computer or hand held electronic device such as a cell phone (see below). The central command center 88 is configured to communicate with the zone posts 80 (or 12, 30, or 42). The central command center 88 is configured to receive the vehicle identification signal 54, the identification signal 84, or the notification signal 94 from the zone posts 80, depending on the system, or any combination of the three. The central command center 88 is then configured to provide the known location of the zone post 80 as an indication of the location of the vehicle 14. In the case of multiple zone posts 80 having sent an identification of notification signal 54, 84, 94, then the central command center 88 provides location of the vehicle 14 as the known location of the zone post 80 that last in-time broadcasted such a signal. The central command center may simply over-right previous data about a vehicle each time it receives a signal from a zone post 80, or the central command center 88 may be configured to, upon receiving a signal from a zone post 80, chronologically log data related to the known location of the zone post and the data to identify the vehicle.

The central command center 88 may be configured to, upon receipt of at least one make and model query from a user, display zone posts 80 with vehicles having differing VIN numbers but fitting the at least one make and model query. The central command center 88 may be configured to, upon receipt of at least one trouble code query from a user, display zone posts with vehicles having the at least one trouble code query. The central command center 88 may also be configured to communicate with a hand held electronic device 98 (see FIG. 8), such as a cellular phone. The hand held electronic device 98 may be configured to aid a user in locating a vehicle 14 based on the location of the zone post 80 that provided the last in time identification signal. The hand held electronic device 98 may be used to download an application (not shown) to be used with the system or central command center 88. The application may be downloadable directly from communication with the central command center 88 or through the internet or app store. The downloadable application for the hand held electronic device 98 that is provided to the user is configured to, upon receipt of a data to identify a vehicle query, provide the location of a zone post that sent the notification signal with the data to identify the vehicle. The hand held electronic device 98 may simply act as a graphical user interface to the central command center 88.

Figure 7:
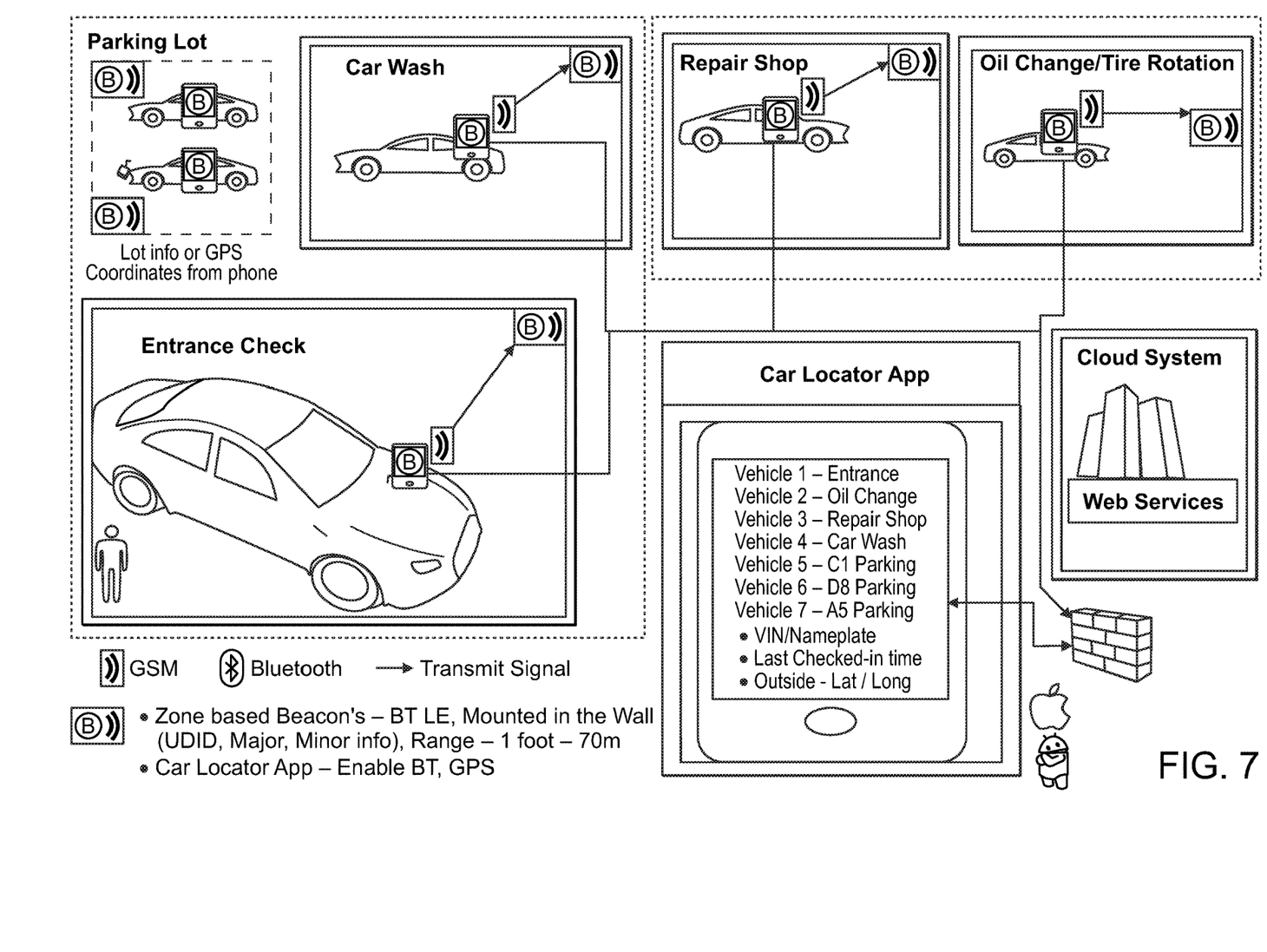
FIG. 7 is a diagrammatic illustration of a car locator application for a hand held electronic device utilizing aspects of the disclosure.

FIG. 7 shows a car locator application for a hand held electronic device utilizing aspects of the disclosure. In this figure zone posts are located at different locations inside a dealership or rental car facility and the system utilities a mobile phone application as a bridge to notify the vehicle's last known state to the backend system.

Figure 8:
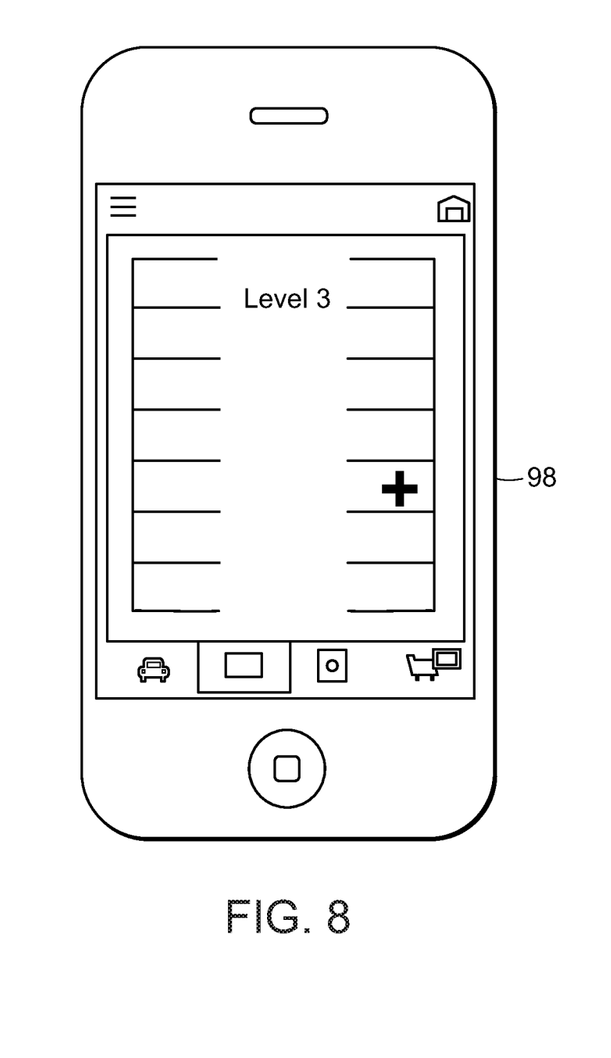
FIG. 8 is a diagrammatic illustration of a hand held electronic device, upon user input with vehicle information, displaying a location of a zone last in-time broadcasted an identification signal that aligns with the vehicle information.

FIG. 8 shows a representation of how a mobile application on a hand held electronic device 98 might display a location of a zone post 80 that last in-time broadcasted an identification signal as a representation of where a vehicle is located.

Figure 9A:
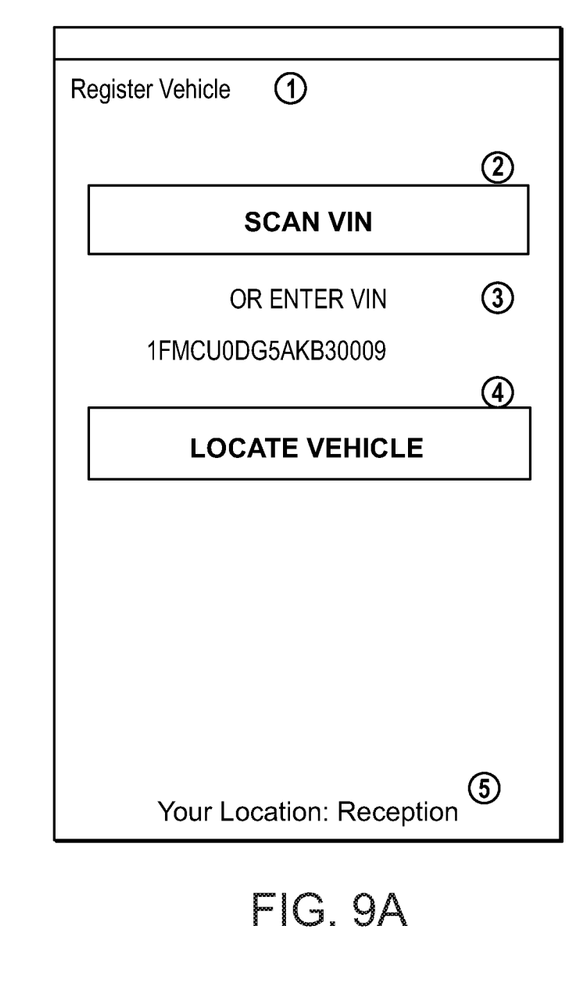
FIGS. 9a-9c are illustrations of mobile phone application screens.
Figure 9B:
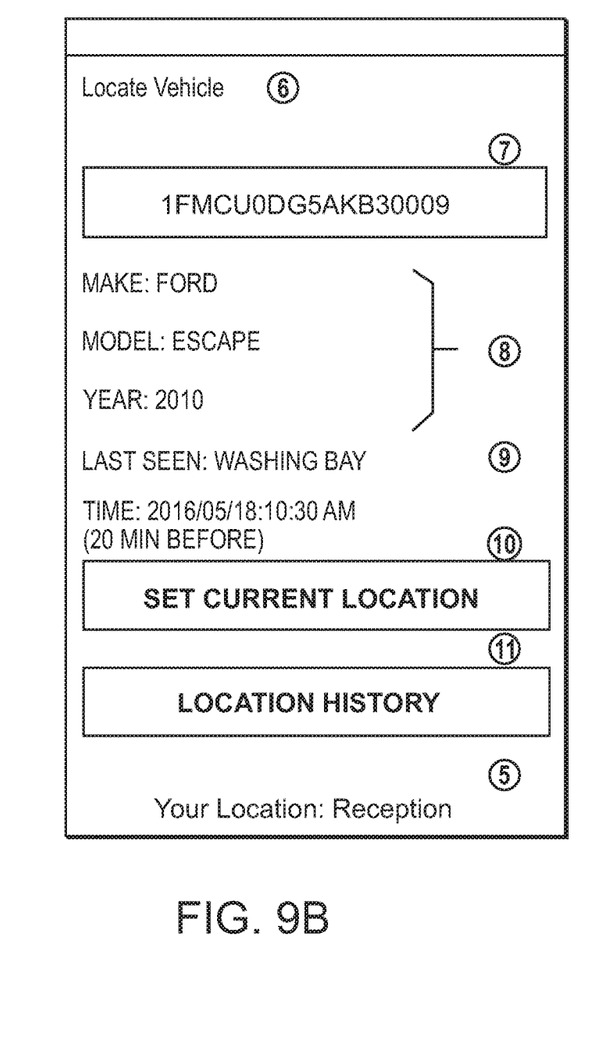
Figure 9C:
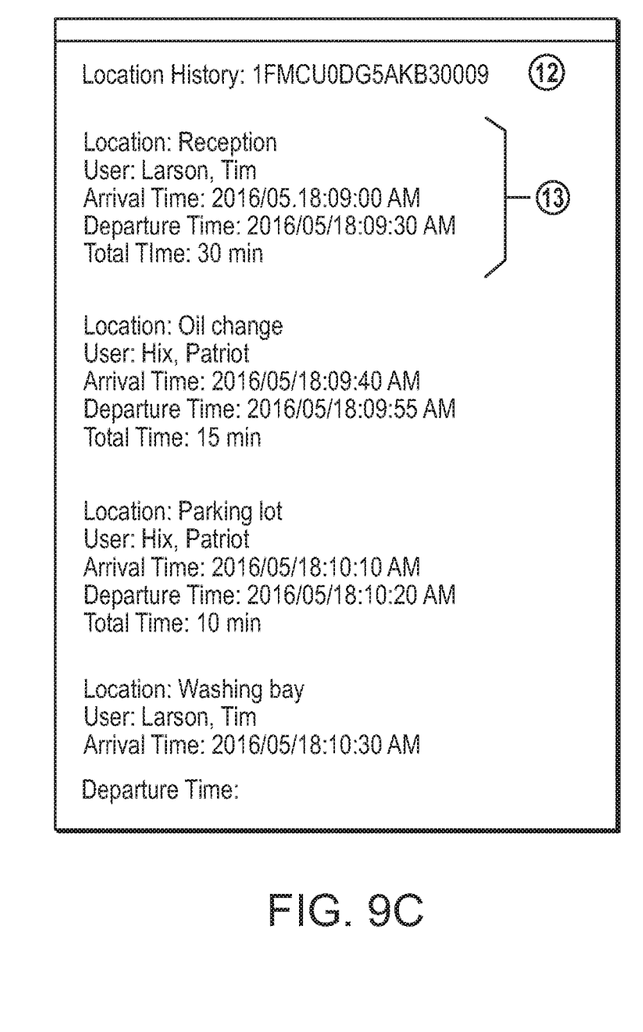

FIGS. 9a-9c are further illustrations of a mobile phone application used in conjunction with the aspects and embodiments of this patent application. FIG. 9a allows for a VIN to be scanned or manually entered. FIG. 9b provides vehicle information and last known location (as provided by the last zone post to send a notification signal of the vehicle being in proximity of the zone post). FIG. 9b also allows for a link to location history. FIG. 9c displays vehicle location history based on the notification signals of the zone posts the vehicle came in proximity with.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A system for locating a vehicle, comprising:
   zone posts, each zone post configured to be spaced apart from adjacent zone posts in known locations and each zone post configured to, upon a vehicle passing into a proximity of the zone post, emit a Tire Pressure Monitoring System (TPMS) tire pressure sensor excitation signal to activate a TPMS sensor of the vehicle, and further configured to receive an identification signal emitted from the activated TPMS sensor in response to the excitation signal, and broadcast a vehicle identification signal based on the received TPMS sensor identification signal; and
   a central command center configured to communicate with the zone posts, the central command center further configured to receive the vehicle identification signal from at least one of the zone posts and provide the known location of the zone post as an indication of the location of the vehicle.

2. The system of claim 1, wherein the central command center is configured to provide the indication of the location of the vehicle as the known location of the zone post that last in-time broadcasted the identification signal.

3. The system of claim 1, wherein the excitation signal emitted from the zone post is substantially 125 Kilohertz.

4. The system of claim 1, wherein the identification signal emitted from an activated TPMS sensor is substantially 315 or 433 Megahertz.

5. The system of claim 1, wherein the vehicle identification signal emitted from the zone post is substantially 2.4 or 5 Gigahertz.

6. The system of claim 1, wherein the vehicle identification signal is the TPMS sensor identification number.

7. A system for locating a vehicle, comprising:
   a dongle configured to be plugged in to an OBDII port of a vehicle and emit a vehicle identification signal;
   zone posts configured to be spaced apart from adjacent zone posts in known locations and configured to communicate with a central command center, each zone post configured to receive the vehicle identification signal emitted from the dongle when it comes in proximity to the zone post, and further configured to send the vehicle identification signal to the central command center; and
   the central command center configured to receive the vehicle identification signal from at least one of the zone posts and provide a location of the zone post as an indication of the location of the vehicle.

8. The system of claim 7, wherein the central command center is configured to communicate with a hand held electronic device, the hand held electronic device configured to aid a user of the a hand held electronic device in locating a vehicle based on the location of the zone post that provided the last in time identification signal.

9. The system of claim 7, wherein the dongle connects with the vehicle to access vehicle identification information.

10. The system of claim 9, wherein the vehicle identification information includes the Vehicle Identification Number (VIN) of the vehicle.

11. The system of claim 10, wherein the VIN contains make and model information of a vehicle, and the central command center is configured to, upon receipt of at least one make and model query from a user, display zone posts with vehicles having differing VIN numbers but fitting the at least one make and model query.

12. The system of claim 7, wherein the dongle is further configured to access trouble code information of the vehicle and relay the trouble code information on to the central command center.

13. The system of claim 12, wherein the central command center is configured to, upon receipt of at least one trouble code query from a user, display zone posts with vehicles having the at least one trouble code query.

14. A system for locating a vehicle, comprising:
- a zone post configured to generate an excitation signal in response to detection of a vehicle entering a proximity oval around the zone post and to receive an identification signal from the vehicle in response to the excitation signal and, upon receipt of identification signal, send a notification signal indicating receipt of the identification signal, the notification signal including within data to identify the vehicle.

15. The system of claim 14, further comprising:
- a dongle configured to be plugged in to an OBDII port of the vehicle, wherein the dongle sends the identification signal.

16. The system of claim 14, wherein the identification signal is sent by a tire pressure monitoring sensor of the vehicle.

17. The system of claim 14, further comprising:
- a downloadable application for hand held electronic device provided to a user, the downloadable application configured to, upon receipt of a data to identify a vehicle query, provide the location of the zone post that sent the notification signal with the data to identify the vehicle.

18. The system of claim 17, wherein the zone post is a number of zone posts spaced apart from adjacent zone posts in known locations.

19. The system of claim 18, further comprising:
- a central command center configured to receive the notification signals from the number of zone posts, and the central command center further configured to, upon receiving the notification signal, chronologically log data related to the known location of the zone post and the data to identify the vehicle.

20. The system of claim 14, wherein the proximity oval has a radial distance of 3 feet or less around the zone post.

* * * * *